United States Patent
Hellmich et al.

(10) Patent No.: US 9,279,687 B2
(45) Date of Patent: Mar. 8, 2016

(54) DATA SECURITY SYSTEM FOR A NAVIGATION SYSTEM

(75) Inventors: Jürgen Hellmich, Hamburg (DE);
Normen Altiparmak, Wittdorf (DE);
Lars Koslowski, Henstedt-Ulzburg (DE)

(73) Assignee: HARMAN BECKER AUTOMOTIVE SYSTEMS GMBH, Karlsbad (DE)

( * ) Notice: Subject to any disclaimer, the term of this patent is extended or adjusted under 35 U.S.C. 154(b) by 0 days.

(21) Appl. No.: 11/176,573

(22) Filed: Jul. 6, 2005

(65) Prior Publication Data

US 2006/0009906 A1    Jan. 12, 2006

(30) Foreign Application Priority Data

Jul. 6, 2004 (EP) .................................. 04015882

(51) Int. Cl.
*G06F 11/00* (2006.01)
*G01C 21/26* (2006.01)

(52) U.S. Cl.
CPC .................................. *G01C 21/26* (2013.01)

(58) Field of Classification Search
CPC ............................ H04L 63/08; G06F 21/6218
USPC ........ 701/201, 210; 726/2; 713/193, 161, 168
See application file for complete search history.

(56) References Cited

U.S. PATENT DOCUMENTS

| | | | |
|---|---|---|---|
| 5,787,170 A | 7/1998 | Op de Beek | 380/4 |
| 5,887,269 A * | 3/1999 | Brunts et al. | 701/208 |
| 6,741,932 B1 * | 5/2004 | Groth et al. | 701/210 |
| 2002/0069360 A1 | 6/2002 | Thoone et al. | 713/185 |
| 2003/0084313 A1 * | 5/2003 | Tada | 713/193 |
| 2005/0017851 A1 * | 1/2005 | Allison | 340/425.5 |

FOREIGN PATENT DOCUMENTS

EP    1189409 A2    9/2001

* cited by examiner

*Primary Examiner* — Anthony Brown
(74) *Attorney, Agent, or Firm* — Artegis Law Group, LLP

(57) ABSTRACT

A data security system for a navigation system comprising an enabling/disabling unit for enabling or disabling a data transfer from a data memory to a data storage unit of the navigation system, an identification unit for identifying an identification code, such as a vehicle or navigation system identification code, and a comparison unit for comparing these identification codes with identification codes stored in the enabling/disabling unit, where the enabling/disabling unit may enable or disable the data transfer responsive to the comparison. If a vehicle or navigation system identification code is not stored in the enabling/disabling unit, a read/write unit writes an identification code retrieved by an identification unit into the enabling/disabling unit.

37 Claims, 6 Drawing Sheets

DATA SECURITY SYSTEM FOR A NAVIGATION SYSTEM

CROSS-REFERENCE TO RELATED APPLICATIONS

This application claims priority to European Patent Application Serial No. 04 015 882.6 filed Jul. 6, 2004, which application is incorporated into this application in its entirety by reference.

BACKGROUND OF THE INVENTION

1. Field of the Invention

The invention relates to a data security system for a navigation system and to a method for transmitting navigation data from a data memory to a data storage unit of a navigation system.

2. Related Art

Navigation systems are available that provide users, such as drivers when the navigation systems are installed in vehicles, with various navigation functions and features. These navigation systems can determine a route from a specified starting location to a certain destination and can guide a traveler along this route. The navigation system may then provide the user with information about the optimal route to the destination in the form of instructions that identify the maneuvers required for the user to travel from the present location to the destination location.

To provide these navigation functions and other functions, the navigation system uses detailed data bases comprising map data that represent physical features in a geographic region, these data bases including data representing the roads and intersection in a geographic region. The data bases may also include information about turn restrictions at intersections, speed limits along the roads, street names of the various roads, points of interest ("POI"), information about monuments, hotels, restaurant, and so on. These navigation data bases are normally provided on a data memory, e.g., a CD-ROM disk that is inserted into the navigation system. Recently, the use of fixed disks or hard disks permanently arranged in the navigation system has become popular.

However, after a certain amount of time, the information in the navigation data bases that form the basis for calculating a route to the destination location may need to be updated because the data may no longer correspond to the actual conditions in the geographic region. For example, routes may have changed or new streets may have been built, or street names or POI data may have changed since the creation of the navigation data base. When a CD-ROM disk is used, the user gets a new CD-ROM disk containing the new data. In the case of a hard disk or fixed disk, the user is provided with a data memory containing the new updated navigation data that have to be transmitted to the fixed disk of the navigation system. When the navigation data have been transmitted to the hard disk of the navigation system, the data memory is no longer necessary for the functioning of the navigation programs. As a consequence, the data memory with the updated data may be used several times to update several different navigation systems. However, this is normally prohibited by applicable law or by contractual obligation, because, when buying the update navigation data base, the user is only allowed to use the updated data on one navigation system or on one vehicle.

Therefore, a need exists to ensure that update navigation data to be transmitted to a fixed disk of a navigation system may only be used according to applicable law or contractual obligation, and that any data transfer to the fixed disk of the navigation system may be controlled so as to achieve this objective.

SUMMARY

The invention provides a security system for a navigation system that has an enabling/disabling unit for enabling or disabling data from a data memory to be transferred or transmitted to a data storage unit of the navigation system. The security system may also include a unit for identifying identification codes associated with the navigation system or a vehicle in which a navigation system resides. Furthermore, a security system may include a comparison unit capable of comparing the identification code, such as the vehicle or a navigation system identification code, with an identification code associated with the enabling/disabling unit. The comparison unit may then enable/disable the transfer of data to the data storage unit of the navigation system in response to the comparison made by the comparison unit.

In particular, in one example of one embodiment, the enabling/disabling unit enables the data transfer of navigation data to the data storage unit in the navigation system, if the navigation system identification code and enabling/disabling unit identification codes coincide, and disables the data transfer if the two identification codes do not coincide. The identification code of a particular vehicle or navigation system may be stored on the enabling/disabling unit. In this manner, navigation data may then only be transferred to navigation systems that have an identification code that coincides with the identification code stored in the navigation system. Thus, navigation data may not be copied to navigation systems that possess identification codes that do not coincide with the identification code stored in the enabling/disabling unit.

Other systems, methods and features of the invention will be or will become apparent to one with skill in the art upon examination of the following figures and detailed description It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

DETAILED DESCRIPTION

FIGS. 1-6 illustrate several examples of various implementations of a security system capable of controlling the transfer of data to a navigation system. Reference is made throughout this application and in the figures to the term "unit." As used, the term "unit" may refer to either a software module or a hardware component that may perform one or more functions or procedures. With respect to software, a unit may be part of a program that may be composed of one or more units that are independently developed and linked together when the program is executed. With respect to hardware, the unit may be any self-contained hardware component or a hardware component that comprises two or more hardware or software components.

Figure 1:
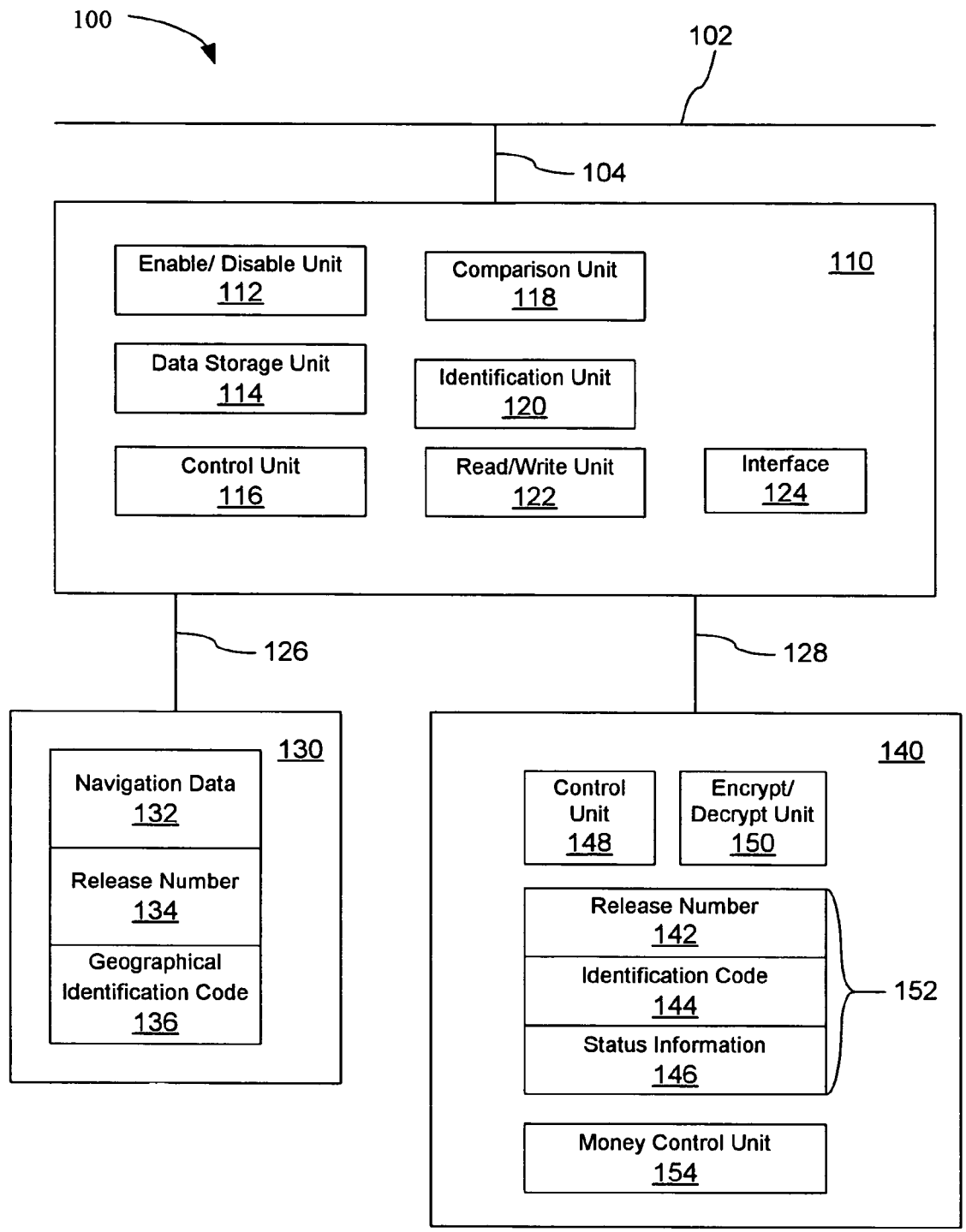
FIG. 1 shows a block diagram illustrating an example of one implementation of a data security system for enabling or disabling a data transfer from a data memory to a navigation system

FIG. 1 shows a block diagram of a data security system 100 that may be used for enabling or disabling the data transfer from a data memory to a data storage unit. As illustrated in FIG. 1, a navigation system 110, such as a navigation system of a vehicle, may be updated with navigation data provided on a data memory 130. To ensure that the data provided on the data memory 130 may be copied to only one navigation system and not a plurality of navigation systems, an enabling/disabling unit 140 may also be provided. The navigation data provided on the data memory 130 may be transferred to a data storage unit 114 of the navigation system 110.

The navigation system 110 may further include an enable/disable unit 140 that enables and disables the data transfer from the data memory 130 to the data storage unit 114. Before the data transfer is enabled, an identification unit 120 in the navigation system 110 may retrieve an identification code, such as a vehicle identification code, provided on a bus system 102 of a vehicle to which the navigation system 110 is connected by the connection 104. An identification code may be any unique string of characters that identifies a navigation system or a vehicle or other device that includes a navigation system. In an example implementation, the identification unit 120 may retrieve a vehicle identification code. However, the identification unit 120 may also retrieve the navigation system identification code of the navigation system 110. A comparison unit 118 may then compare the retrieved identification code to an identification code 144 stored in memory 152 on the enabling/disabling unit 140.

To perform such comparison, the enabling/disabling unit 140 is connected to the navigation system 110 via an interface 124 provided in the navigation system 110. The interface 124 is configured to provide a connection to the enabling/disabling unit 140, and when a smart card, for example, is used as the enabling/disabling unit 140, the interface 124 may be a read/write unit that is able to read the data stored on the smart card. The connections 128 and 126 of the enabling/disabling unit to the navigation system 110 and of the data memory 130 to the navigation system 110, respectively, may be separate connections. It is appreciated by those skilled in the art that a single connection may also be used to connect both the data memory 130 and the enabling/disabling unit 140 to the navigation system 110, and that any of these connections may be wireless or via wires.

When the data memory 130 is accessed for the first time and the data stored therein have not yet been transmitted to the data storage unit 114, the appropriate identification code may not be stored on the enabling/disabling unit 140. Therefore, the control unit 116 may verify whether an identification code 144 is already present in memory 152 on the enabling/disabling unit 140. If the identification code 144 is not found, a read/write unit 122 may then write the vehicle identification code retrieved from the identification unit 120 or the navigation system identification code into the memory 152 of the enabling/disabling unit 140. It is appreciated by those skilled in the art that when writing the identification code of the vehicle into the memory 152 of the enabling/disabling unit 140, an encrypt/decrypt unit 150 may encrypt the identification code.

The control unit 116 in the navigation system 110 may also have encrypting/decrypting capabilities. The enabling/disabling unit 140 may further include a control unit 148 to control the handling of the data. Depending on where the respective identification codes are compared and whether the identification code is encrypted or not, the control unit 148 may be provided on the enabling/disabling unit 140.

The enabling/disabling unit 140 may also include the memory 152, which may contain the identification code 144, a release number 142 of the navigation data transmitted to the data storage unit 114, and status information 146 of the data transfer. The status information 146 may include information about when the update has been made, if the update has been successful, what kind of data has been transmitted, etc. The enabling/disabling unit 140 may further include a money control unit 154. The money control unit 154 allows the deposit and withdrawal of money from the enabling/disabling unit 140, as will be explained in greater detail below.

The data memory 130 may include the navigation data 132 that are used for updating the data stored on the data storage unit 114, the release number 134 of the navigation data, and a geographical identification code 136 of the data A method of using the release number 134 and the geographical identification code 136 will be explained in greater detail below. It is appreciated by those skilled in the art that the navigation system may include many other features necessary for guiding a driver of a vehicle to a predetermined destination. For the sake of clarity, however, these features are omitted from the block diagram shown in FIG. 1.

Figure 2:
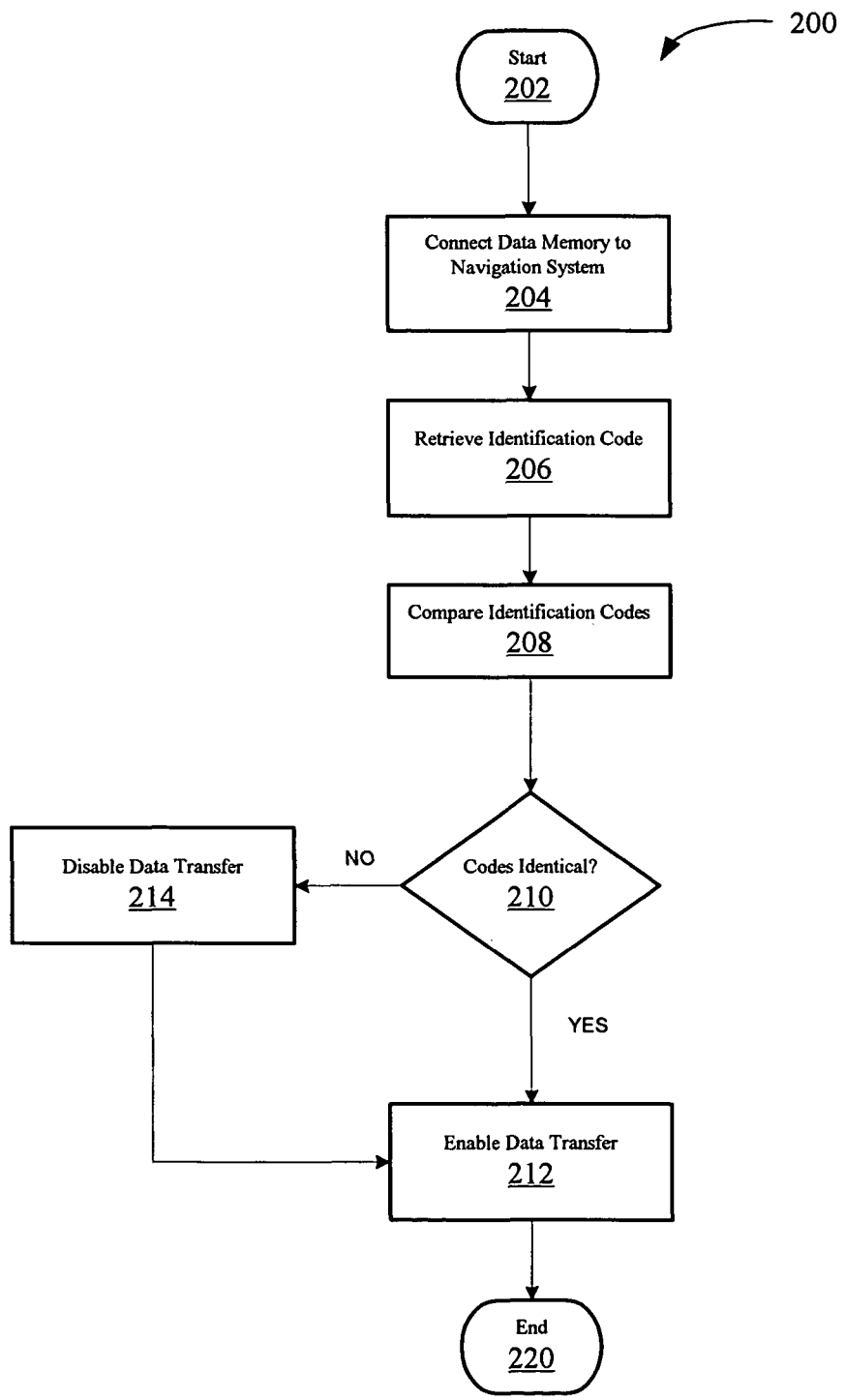
FIG. 2 shows a flow chart illustrating one example process for transmitting navigation data to a data storage unit of a navigation system

FIG. 2 shows a flow chart of an example process for enabling or disabling the transfer of navigation data from the data memory 130 to the data storage unit 114 in the navigation system 110. The process starts at step 202, and in the next step 204, the data memory 130 is connected to the navigation system 110. In step 206, an identification code, such as a vehicle identification code or a navigation system identification code, is retrieved, e.g., via the bus system 102, and in step 208, the identification code retrieved in step 206 is compared to the identification code 144 stored on the enabling/disabling unit 140. For the comparison of the two identification codes, the enabling/disabling unit 140 may be connected to the navigation system 110 via the interface 124. The data security system 100 may be designed in such a way that for all of the steps shown in FIG. 2, the enabling/disabling unit 140 has to be connected to the navigation system 110.

In decision step 210, it is determined whether the two identification codes coincide. An identification code may be determined to coincide with another identification code if predetermined criteria are met when comparing the two identification codes. For example, the two identification codes may be determined to coincide if they exactly match, character by character. Two identification codes may also be determined to coincide if all or less than all of the characters in one identification code correspond in some predetermined manner to the characters in the other identification code.

In the affirmative case, the data transfer of the navigation data 132 is enabled in step 212. The data transfer may include the writing of the navigation data 132 into the data storage unit 114 of the navigation system 110. It is not required that the new navigation data 132 replace the older navigation data in the data storage unit 114, and it may also be written into a separate partition of the data storage unit 114, leaving the older navigation data intact. If the two identification codes provided on the enabling/disabling unit 140 and retrieved from the identification unit 120 do not coincide, the data transfer is disabled in step 214. Thus, the navigation data 132 of the data memory 130 may only be used in combination with one vehicle or one navigation device, because the data transfer is only enabled if the identification code stored on the enabling/disabling unit 140 coincides with the identification code retrieved by the identification unit 120.

Figure 3:
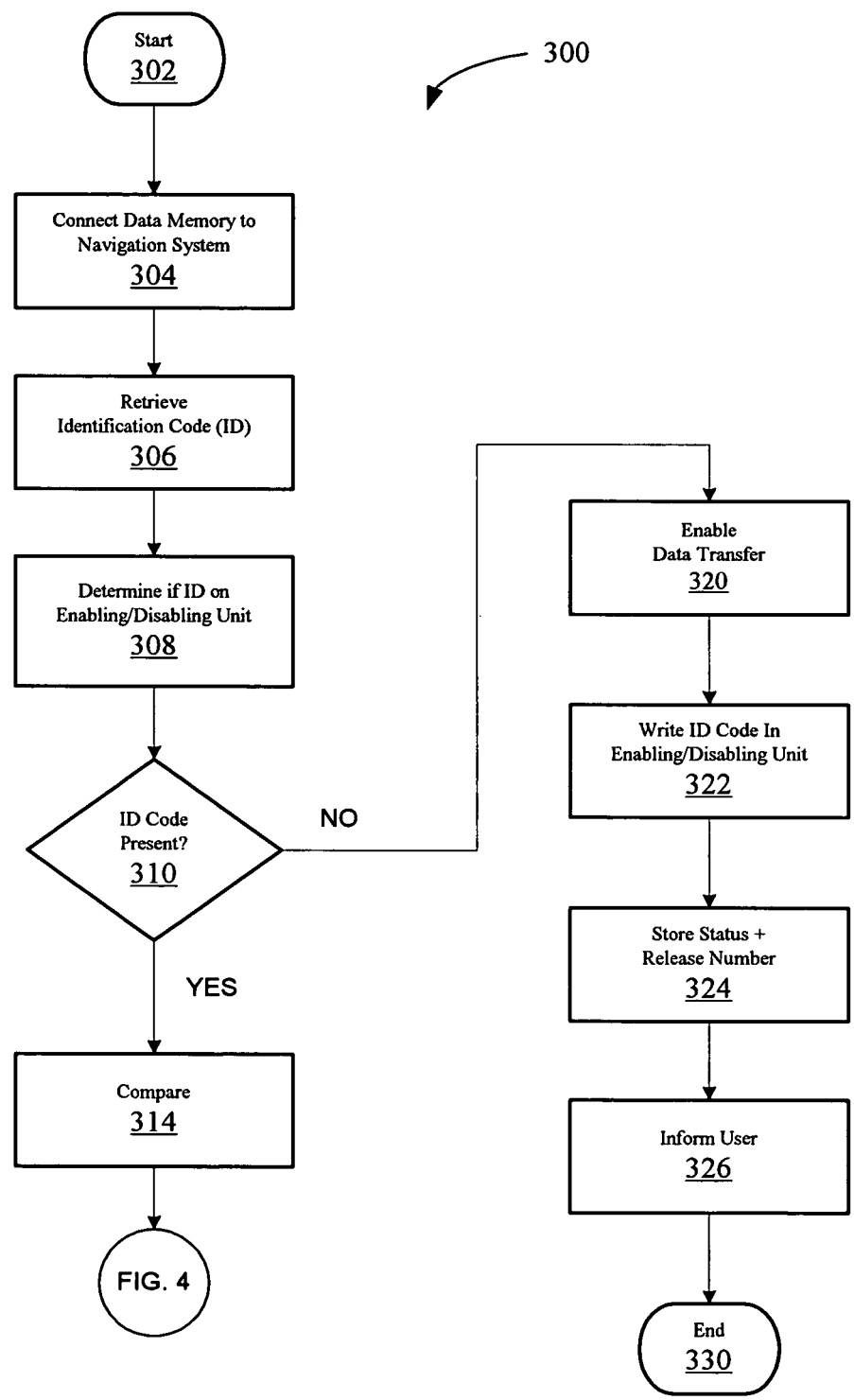
FIG. 3 shows a flowchart further illustrating the example process illustrated in FIG. 2.

FIG. 3 shows a flow chart that illustrates an example process where the identification code 144 is stored on the enabling/disabling unit 140. When the user purchases the data memory 130 in the form of a CD-ROM disk or DVD or any other data storage medium, the user is entitled to use the navigation data 132 contained on the data memory 130. In order to prevent the user from copying the navigation data 132 to different navigation systems installed in different cars or vehicles, the data memory 130 may be sold together with the enabling/disabling unit 140, which, at this stage, is not linked to a specific vehicle or a specific navigation system. The enabling/disabling unit 140 does not hold the release number 142, the identification code 144, or the status information 146, if the navigation data 132 have not yet been used.

The process shown in FIG. 3 starts in step 302. In step 304, the data memory 130 is connected to the navigation system 110, and in step 306, either the vehicle identification code or the navigation identification code or both are retrieved by the identification unit 120. Steps 304 and 306 correspond to the steps 204 and 206, respectively, shown in FIG. 2. After retrieving the identification code in step 306, it is then determined whether any identification code 144 is stored on the enabling/disabling unit 140. In decision step 310, it is determined whether an identification code, such as a vehicle identification code or a navigation identification code, is present on the enabling/disabling unit 140.

If there is not, the conclusion is made that the data memory 130 has not been used before, i.e., the navigation data 132 have not been transferred to a navigation system. In this case, the data transfer is enabled in step 320 and the navigation data are transmitted to the data storage unit 114 of the navigation system 110. When the data transfer has been completed and the navigation data 132 comprising map or any other data needed for running the navigation system are stored on the data storage unit 114, the retrieved identification code may be written in the enabling/disabling unit 140 in step 322. With the retrieved identification code now stored as identification code 144 in the enabling/disabling unit 140, that enabling/disabling unit 140 may now be configured in such a way that the navigation data 132 and the enabling/disabling unit 140 may only be used in combination with the vehicle or the navigation system identified by the identification code stored on the enabling/disabling unit 140.

In step 324, the status of the data transfer and the release number of the transferred data may also be stored in the release number 142 and status information 146 sections, respectively, of data memory 152 on the enabling/disabling unit 140. In step 326, the user is informed that the data have been transferred to the data storage unit 110. After step 326, the process 300 ends at step 330, and the navigation system may return to the other applications that are available on a navigation system. If the result of decision step 310 is positive, i.e., if a vehicle identification code was already present on the enabling/disabling unit 140, the two identification codes are compared in step 314, and the process continues as shown in FIG. 4.

Figure 4:
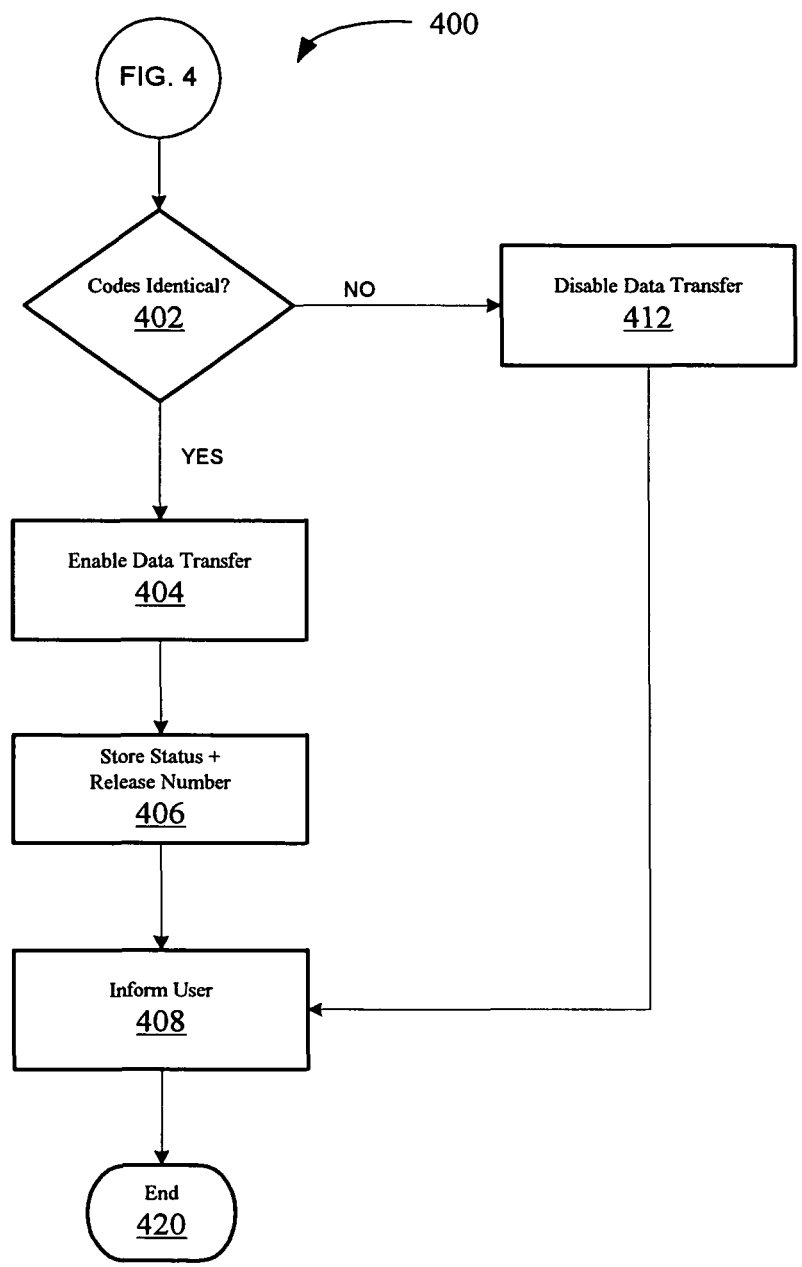
FIG. 4 shows a flowchart further illustrating the example process illustrated in FIG. 2.

FIG. 4 shows the steps carried out after step 314 of FIG. 3. In step 402, the identification code stored on the enabling/disabling unit 140 is compared to the identification code retrieved from the identification unit 120. If the two identification codes coincide, the data transfer is enabled in step 404 and the data are transferred to the data storage unit 114. Because an identification code was already present on the enabling/disabling unit 140, the data memory 130 has already been used once in combination with the vehicle or the navigation system.

The need may arise, however, for the user to reinstall the navigation data 132 on the navigation system 110. As an example, the navigation data 132 previously transferred from the data memory 130 may have been inadvertently erased, and the user now wants to reinstall the data of the data memory 130. In step 406, the status information and the release number are stored on the enabling/disabling unit 140, the status information possibly including information as to whether the data transfer has been successful or not, as well as the time and date of the data transfer. If, as an example, the release number 142 stored on the enabling/disabling unit 140 coincides with the release number 134 stored on the data memory 130, and there is no navigation data in the storage unit 114, then the enabling/disabling unit 140 may enable the transfer of data because it may be assumed that the transfer is a transfer of previously-transferred data In step 408, the user is informed that the data transfer has been successfully completed. If the identification codes compared in step 410 do not coincide, the data transfer is disabled in step 412 and in step 408, the user is informed that the data transfer from the data memory 130 to the navigation system 10 is not possible. In this case, the user may desire to transmit the data to another navigation system or to another vehicle. However, when acquiring the data memory 130 together with the enabling/disabling unit 140, the user normally acquires the right to use the data of the data memory 130 only in combination with a single hardware device.

Figure 5:
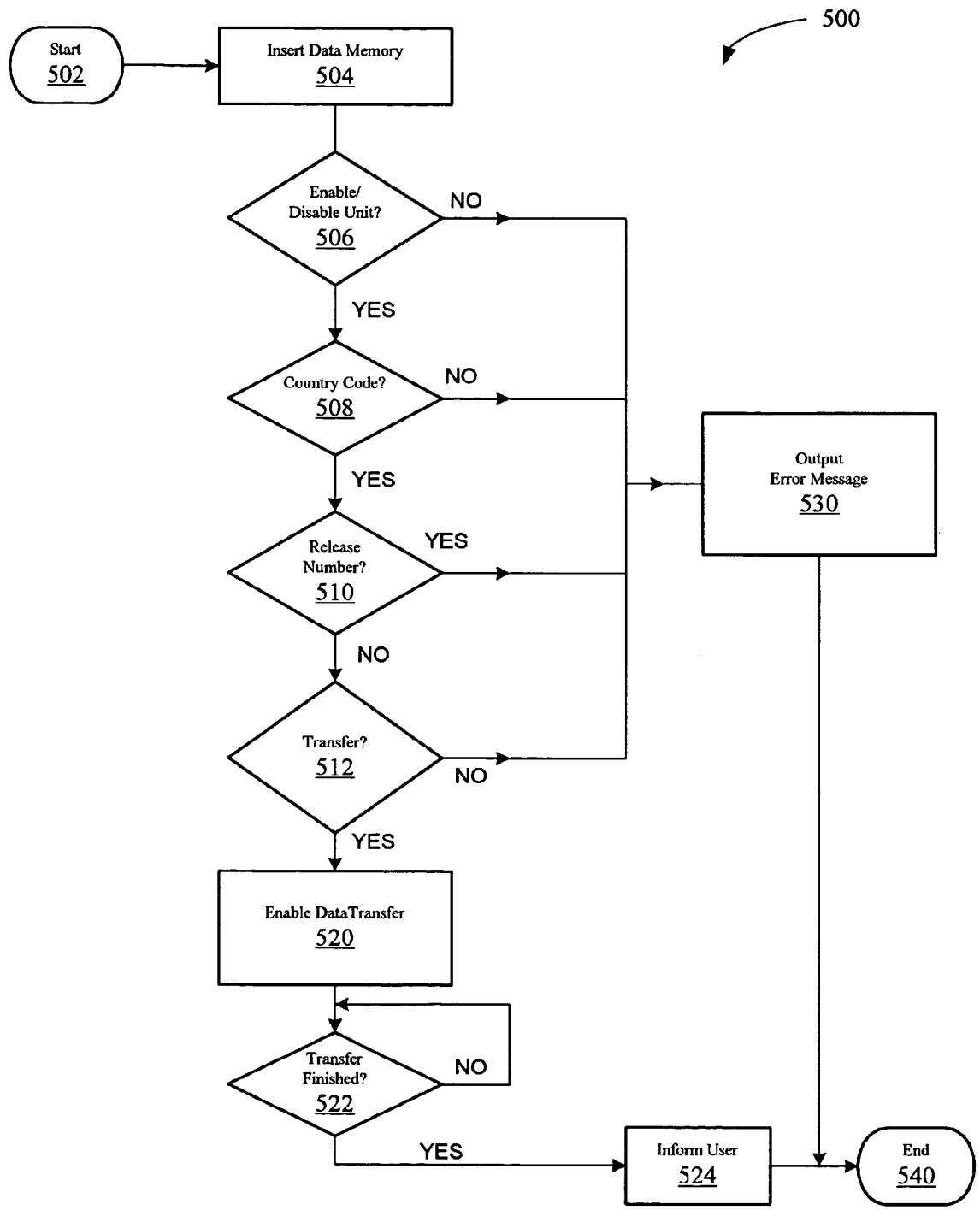
FIG. 5 shows a flowchart illustrating another example of one process for controlling the data transfer to a navigation system.

FIG. 5 shows a flow chart illustrating another example of a process for transmitting navigation data. The process starts in step 502. In step 504, when the user wants to transfer the navigation data 132 to the data storage unit 114, the data memory 130 is inserted into the read/write unit 122, if the data memory 130 is a CD-ROM disk. In the next step, decision step 506, it is determined whether the enabling/disabling unit 140 is also connected to the navigation system 110. The data security system 100 may be configured in such a way that a data transfer is not permitted whenever the enabling/disabling unit 140 is not connected to the navigation system 110. If the enabling/disabling unit 140 is not connected to the navigation system 110, a message may be output to the user in step 530, the message informing the user that a data transfer without the enabling/disabling unit 140 is not permitted, or that the enabling/disabling unit 140 should be connected to the navigation system 110.

If the enabling/disabling unit 140 is connected to the navigation system 110, the next step is decision step 508, which determines whether the geographical identification code 136 stored on the data memory 130 corresponds to the geographical identification code of the data stored on the data storage unit 114, and whether there are any data present on the data storage unit 114. The purpose of step 508 is to preclude the updating of data already present on the data storage unit 114 with data of a different geographical area. If the geographical identification codes do not coincide, an error message is output in step 530, indicating that the data were not transferred to the navigation system 110 because their geographical identification codes did not coincide.

If there are no data present on the data storage unit 114 or if the geographical identification codes coincide, it is then determined in decision step 510 whether the release number of the data of the data memory 130 and the data of the data storage unit 114 coincide. If these two release numbers do not coincide, it may be concluded that the navigation data 132 on the data memory 130 are different from the navigation data already stored on the data storage unit 114. If the release numbers coincide, an error message may be output to the user, informing him, as an example, that the data contained on the data memory 130 are already present on the data storage unit 114.

If the release numbers do not coincide, the data transfer is thus theoretically possible and in step 512, the user is asked one more time whether the data should be transferred to the navigation system 110. If the user does not want to transfer the data, he will respond with "no", and in step 530, an error message will inform the user that the data will not be transferred. If the answer of the user is affirmative, the data transfer is enabled in step 520. In step 522, it is determined whether the data transfer has been completed. When the data transfer is finally completed, the user is informed that the data transfer is completed in step 524. After the user receives an error message in step 530, or is informed that the data transfer is completed in step 524, the process ends in step 540.

Figure 6:
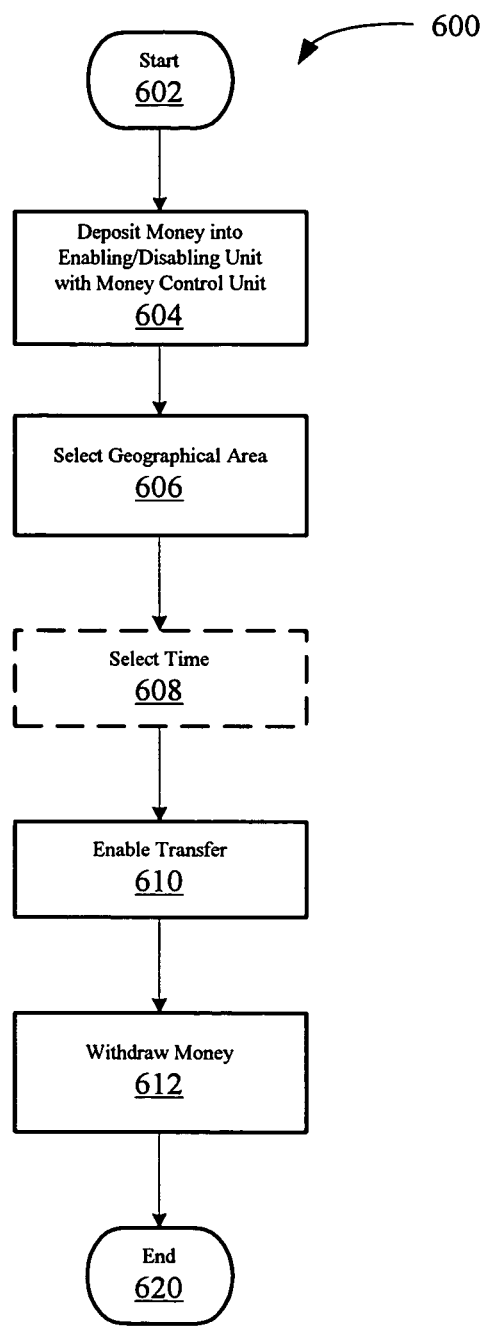
FIG. 6 shows a flowchart illustrating another example of one process of a data transfer in which the user may select the data to be transferred to the navigation system from the data on the data memory.

FIG. 6 shows a flow chart illustrating an example process 600 for enabling or disabling the transfer of navigation data from the data memory 130 to the data storage unit 114 using the money control unit 154 of the enabling/disabling unit 140. In general, the money control unit 154 allows the user to deposit money to or withdraw money from the enabling/disabling unit 140.

The process starts in step 602. In step 604, the user deposits money into money control unit 154 of the enabling/disabling unit 140. For illustrative purposes, steps 604 and 610 of FIG. 6 refer to depositing money to and withdrawing money from, respectively, the money control unit 154, which in most implementations may be done electronically. For example, the user may charge the money control unit 154 on terminals provided by the data provider. In another example implementation, the user may purchase a data security kit that includes a data memory 130 and an enabling/disabling unit 140 that may include a money control unit 154. The money control unit 154 may include a pre-paid amount or credit that may be drawn upon by the user whenever he or she transmits data to their navigation system 110.

Also, although step 604 is shown in FIG. 6 at the start of the process 600, it is not necessary that money be deposited into the money control unit 154 before the process 600 may be initiated. For example, if the navigation data 132 is to be geographically or time limited, then the navigation data 132 may be first selected in steps 606 and 608, and the user may deposit the money before or after the data transfer is enabled in step 610. Additionally, the deposit step 604 and the withdrawal step 612 may be done simultaneously or in a single step at any time in the process 600.

In step 606, if the user does not want to use all the navigation data 132 provided on the data memory 130, the user may select a certain geographical area to be transmitted. For example, the user may want to plan a trip in a certain country and he or she may want data for only that country. When the user does not want to pay for all the navigation data provided on the data memory 130, he or she then selects a certain geographical area. For the selected data only, the transfer is enabled in step 610 and the cost of the data is withdrawn from the money control unit 154 in step 610, with the cost depending on the amount and type of data selected.

The data selected may also be time dependent. In step 608, which may be optional, the user selects a time period for which the selected data will be accessible. For example, the user may need certain data for certain countries only for a predetermined amount of time, e.g., for holidays or a vacation. The user may want to have navigation data for a certain country for a certain amount of time, e.g., for one month. The user may then use the enabling/disabling unit 140 including a money control unit 154 to select the data, select its effective life span, and to transfer the selected data to the user's navigation data 132, which the user will only be entitled to use for the pre-selected amount of time. Time-dependent use of the selected data may be implemented by various means, including implementing an expiration date on the enabling/disabling unit 140 or by making the transmitted data time-dependent, i.e., the data becomes non-accessible after an expiration date has been reached.

After selection by the user of the geographical area of the navigation data and a time period for the accessible life of the selected data, the data transmittal is enabled in step 610. In the next step, step 612, the cost of the selected data is paid by the withdrawal of money from the enabling/disabling unit 140, which payment may take the form of reducing the amount currently credited to the enabling/disabling unit 140. When the data transfer and the payment steps are completed, the process ends in step 620.

Persons skilled in the art will understand and appreciate that one or more processes or process steps described in connection with FIGS. 2 through 6 may be performed by hardware or software, or any combination thereof. If a process or process step is performed by software, the software may reside in software memory (not shown) in the navigation system 110 and/or the data security system 100, or a removable memory medium. The software in software memory may include an ordered listing of executable instructions for implementing logical functions (i.e., "logic" that may be implemented in digital form such as digital circuitry or source code or in analog form such as analog circuitry, may selectively be embodied in any computer-readable medium for use by or in connection with an instruction execution system, apparatus, or device, such as a computer-based system, processor-containing system, or other system that may selectively fetch the instructions from the instruction execution system, apparatus, or device, and execute the instructions. in. the context of this document, a "computer-readable medium" is any means that may contain or store the program for use by or in connection with the instruction execution system, apparatus, or device. The computer-readable medium may selectively be, for example but not limited to, an electronic, magnetic, optical, electromagnetic, or semiconductor system, apparatus, or device. More specific examples, i.e., "a non-exhaustive list" of the computer-readable media, would include the following: an electrical connection (electronic) having one or more wires, a portable computer diskette (magnetic), a RAM (electronic), a read-only memory "ROM" (electronic), an erasable programmable read-only memory (EPROM or Flash. memory) (electronic), an optical fiber (optical), and a portable compact disc read-only memory "CDROM" (optical). Note that the computer-readable medium may even be paper or another suitable tangible medium.

In general, the implementations described above provide for a data security system that provides for the transfer of navigation data from a data memory to a data storage unit in a navigation system, with an enabling/disabling unit being used to retrieve and compare identification codes for the vehicle and its navigation system. By comparing the vehicle or navigation identification codes retrieved by the enabling/disabling unit with an identification code stored in the enabling/disabling unit, the data security system is able to determine whether to enable or disable the data transfer.

In addition to the implementations described above, other implementations may provide for a higher security level by retrieving both a vehicle identification code and a navigation identification code and only enabling the data transfer if both identification codes coincide with the corresponding identification codes stored in the enabling/disabling unit.

In addition to the implementations described above, other implementations may provide for including map data in the navigation date to be transmitted. These map data may include up-to-date street maps, including street names, turn restrictions, speed limits, additional information on restaurants, time tables, or public transport services, etc., as well as three-dimensional graphic data that may be used to produce 3-D images. If an older version of the navigation data is already stored on the data storing unit, the new navigation data or new map data may replace the respective older data. In the case that no navigation data are contained on the data storage unit, the navigation data may be stored on the data storage unit without replacing any other data.

In addition to the implementations described above, other implementations may provide for an enabling/disabling unit that may include a smart card. Smart cards are well known in the art and are normally chip cards that hold information that helps to identify the control unit. In another implementation of the invention, the vehicle and navigation identification codes may be stored in memory on the smart card. Also, the smart card may further include a control unit that controls certain functions and steps carried out on the smart card by the enabling/disabling unit 140.

In addition to the implementations described above, other implementations may provide for a plurality of vehicle or navigation system identification codes for a single user, for example, one with a license to use the data memory on two or more vehicles or navigation systems. In this case, the enabling/disabling unit is configured in such a way that the enabling/disabling unit allows for the storage of a predetermined number of different identification codes. Then, the navigation data may be used in combination with two or more different vehicles or navigation systems. As long as an identification code can be written into the enabling/disabling unit, the data transfer may be enabled. By predetermining the number of identification codes that may be stored on the enabling/disabling unit, the enabling/disabling unit may be configured to allow the writing of a predetermined number of different identification codes on it, thereby enabling the user to use the navigation data provided on the data memory on the predetermined number of different vehicles or navigation systems. In an example of operation, whenever there is an attempt to transmit the navigation data of the data memory to a vehicle, the enabling/disabling unit first determines whether the predetermined number of identification codes have already been written to the enabling/disabling unit. If the memory 152 already contains the predetermined number of identification codes and the retrieved identification code does not correspond to one of the identification codes already stored on the enabling/disabling unit, the data transfer may be disabled.

It will be understood that the foregoing description of numerous implementations has been presented for purposes of illustration and description. It is not exhaustive and does not limit the claimed inventions to the precise forms disclosed. Modifications and variations are possible in light of the above description or may be acquired from practicing the invention. The claims and their equivalents define the scope of the invention.

What is claimed:

1. A data security system for a navigation system, the data security system comprising:
   an enabling/disabling unit comprising unit memory and that communicates with the navigation system via an interface, and is configured to enable and disable a data transfer from a data memory including navigation data to be transmitted to a data storage unit of the navigation system, where the enabling/disabling unit is implemented at least partially in hardware;
   an identification unit operating in the navigation system, the identification unit in signal communication with the enabling/disabling unit via the interface, and configured to identify a vehicle or a navigation system identification code; and
   a comparison unit operating in the navigation system in signal communication with the enabling/disabling unit and with the identification unit, and configured to compare a vehicle or a navigation system identification code stored on the enabling/disabling unit to the respective identification code of the vehicle or navigation system identified by the identification unit,
   a control unit operating in the navigation system and configured to determine whether any vehicle or navigation system identification code is stored on the enabling/disabling unit; and
   a writing unit operating in the navigation system and configured to write to the unit memory the vehicle or navigation system identification code retrieved from the identification unit if any vehicle or navigation system identification code is not stored on the enabling/disabling unit,
   where the enabling/disabling unit enables or disables the data transfer responsive to the comparison where the enabling/disabling unit does not allow access to the navigation data until after the comparison.

2. The data security system of claim 1, where the enabling/disabling unit enables the data transfer to the data storage unit if the two vehicle identification codes or the two navigation system identification codes coincide, and disables the data transfer if the two vehicle identification codes or the two navigation system identification codes do not coincide.

3. The data security system of claim 2, where the writing unit writes the vehicle or navigation system identification code in the enabling/disabling unit once the navigation data have been transferred to the data storage unit and stored on the data storage unit.

4. The data security system of claim 1, where the data memory is a removable data memory that may be removably arranged in the navigation system, the data storage unit of the navigation system being a fixed disk.

5. The data security system of claim 1, where the navigation data to be transmitted to the data storage unit includes map data for the navigation system.

6. The data security system of claim 1, where the enabling/disabling unit stores the release number of the navigation data to be transmitted to the data storage unit and the status of the data transfer to the data storage unit.

7. The data security system of claim 1, where the enabling/disabling unit includes a smart card including a memory.

8. The data security system of claim 1, further including an interface configured to connect the enabling/disabling unit to the navigation system for the data transfer to the data storage unit.

9. The data security system of claim 1, where the data memory includes one or more geographical identification codes that identify one or more geographical areas of the stored data.

10. The data security system of claim 1, where the enabling/disabling unit further includes a money control unit configured to allow the deposit of money to, and the withdrawal of money from, the enabling/disabling unit.

11. The data security system of claim 10, where the amount of money withdrawn from the enabling/disabling unit for the transmittal of navigation data is determined based on the geographic identification code assigned to the navigation data being transmitted and the time for which the transmitted data will be accessible.

12. A method performed in a general purpose processor for transmitting navigation data from a data memory to a data storage unit of a navigation system that has received a data memory device and includes an enabling/disabling unit, the method comprising:
retrieving a vehicle or navigation system identification code;
comparing a vehicle or navigation system identification code stored in the enabling/disabling unit to the retrieved identification code;
enabling or disabling the data transfer to the data storage unit of the navigation system responsive to the comparison where the enabling/disabling unit does not allow access to the navigation data until after the comparison;
determining whether any vehicle or navigation system identification code is stored on the enabling/disabling unit; and
writing the retrieved vehicle or navigation system identification code in the enabling/disabling unit if it is determined that any vehicle or navigation system identification code is not stored on the enabling/disabling unit.

13. The method of claim 12, where the data transfer to the data storage unit of the navigation system is enabled if the two vehicle identification codes or the two navigation system identification codes coincide, and the data transfer is disabled if the two vehicle identification codes or the two navigation system identification codes do not coincide.

14. The method of claim 12, further comprising the step of storing a release number of the data transmitted to the data storage unit and a status of the data transfer on the enabling/disabling unit.

15. The method of claim 12, where the vehicle or navigation system identification code is stored in the enabling/disabling unit in an encrypted format.

16. The method of claim 12, where the enabling/disabling unit is in signal communication with the navigation system during the data transfer to the data storage unit.

17. The method of claim 16, where the data transfer to the data storage unit is disabled whenever the enabling/disabling unit is not in signal communication with the navigation systems.

18. The method of claim 12, further including the steps of:
comprising a geographical identification code contained in the data stored on the data memory to a geographical identification code contained in the data already stored on the data storage unit of the navigation system; and
updating the data contained on the data storage unit with the data stored on the data memory if the two geographical identification codes coincide.

19. The method of claim 12, further including:
comparing a release number of the data contained on the data memory to the release number of the data contained on the data storage unit of the navigation system; and
updating the data contained on the data storage unit by using the data stored on the data memory if the release number of the data contained on the data memory is more recent than the release number of the data contained on the data storage unit of the navigation system.

20. The method of claim 12, further including:
selecting data of one or more predetermined geographical areas; and
transmitting the data of the predetermined selected geographical areas to the data storage unit of the navigation system.

21. The method of claim 20, further including the step of withdrawing money from a money control unit included in the enabling/disabling means, where the amount of the money withdrawn is dependent on the selected geographical areas.

22. The method of claim 12, further comprising the step of informing a user of the navigation system that the data have been transmitted to the data storage unit and stored thereon.

23. The method of claim 12, further including the steps of:
determining the number of identification codes stored in the enabling/disabling unit;
comparing the number of identification codes stored in the enabling/disabling unit with a predetermined number; and
disabling the data transfer to the data storage unit of the navigation system if the number of identification codes stored is equal to or exceeds the predetermined number.

24. The method of claim 23, further including the steps of:
comparing the retrieved vehicle or navigation system identification code with the identification codes stored in the enabling/disabling unit; and
enabling the data transfer to the data storage unit of the navigation system if the retrieved vehicle or navigation system identification code coincides with an identification code stored in the enabling/disabling unit.

25. A non-transitory computer-readable storage medium comprising instructions configured to perform, when executed by the navigation system, the following:
connecting a data memory to a navigation system via an Interface;
retrieving a vehicle or navigation system identification code;
comparing, a vehicle or navigation system identification code stored in an identification code memory of the enabling/disabling unit that is in signal communication with the navigation system, to the retrieved identification code;
enabling or disabling the data transfer to a data storage unit of the navigation system responsive to the comparison where the enabling/disabling unit does not allow access to the navigation data until after the comparing step;
determining whether any vehicle or navigation system identification code is stored on the enabling/disabling unit; and
writing via the interface the retrieved vehicle or navigation system identification code to the identification code memory in the enabling/disabling unit if it is determined that any vehicle or navigation system identification code is not stored in the identification code memory.

26. The computer-readable storage medium of claim 25, where the data transfer to the data storage unit of the navigation system is enabled if the two vehicle identification codes or the two navigation system identification codes coincide, and the data transfer is disabled if the two vehicle identification codes or the two navigation system identification codes do not coincide.

27. The computer-readable storage medium of claim 25, further comprising instructions configured to perform, when executed by the navigation system, for storing a release number of the data transmitted to the data storage unit and a status of the data transfer on the enabling/disabling unit.

28. The computer-readable storage medium of claim 25, where the vehicle or navigation system identification code is stored in the enabling/disabling unit in an encrypted format.

29. The computer-readable storage medium of claim 25, where the enabling/disabling unit is in signal communication with the navigation system during the data transfer to the data storage unit.

30. The computer-readable storage medium of claim 29, where the data transfer to the data storage unit is disabled whenever the enabling/disabling unit is not in signal communication with the navigation system.

31. The computer-readable storage medium of claim 25, further including instructions configured to perform, when executed by the navigation system:
   comparing a geographical identification code contained in the data stored on the data memory to a geographical identification code contained in the data already stored on the data storage unit of the navigation system; and
   updating the data contained on the data storage unit with the data stored on the data memory if the two geographical identification codes coincide.

32. The computer-readable storage medium of claim 25, further including instructions configured to perform, when executed by the navigation system:
   comparing a release number of the data contained on the data memory to the release memory of the data contained on the data storage unit of the navigation system; and
   updating the data contained on the data storage unit by using the data stored on the data memory if the release number of the data contained on the data memory is more recent than the release number of the data contained on the data storage unit of the navigation system.

33. The computer-readable storage medium of claim 25, further including instructions configured to perform, when executed by the navigation system,:
   selecting data of one or more predetermined geographical areas; and
   transmitting the data of the predetermined selected geographical areas to the data storage unit of the navigation system.

34. The computer-readable storage medium of claim 33, further including instructions configured to perform, when executed by the navigation system, withdrawing money from a money control unit included in the enabling/disabling unit, where the amount of the money withdrawn is dependent on the selected geographical areas.

35. The computer-readable storage medium of claim 25, further comprising instructions configured to perform, when executed b a navigation system, informing a user of the navigation system that the data have been transmitted to the data storage unit and stored thereon.

36. The computer-readable storage medium of claim 25, further including instructions configured to perform, when executed by a navigation system:
   determining the number of identification codes stored in the enabling/disabling unit;
   comparing the number of identification codes stored in the enabling/disabling unit with a predetermined number; and
   disabling the data transfer to the data storage unit of the navigation system if the number of identification codes stored is equal to or exceeds the predetermined number.

37. The computer-readable storage medium of claim 36, further including instructions configured to perform, when executed by a navigation system:
   comparing the retrieved vehicle or navigation system identification code with the identification codes stored in the enabling/disabling unit; and enabling the data transfer to the data storage unit of the navigation system if the retrieved vehicle or navigation system identification code coincides with an identification code stored in the enabling/disabling unit.

* * * * *